(12) United States Patent
Ikuma

(10) Patent No.: US 7,151,918 B2
(45) Date of Patent: Dec. 19, 2006

(54) LOW REFLECTION LIMITER AND TRANSMITTING/RECEIVING MODULE UTILIZING SAME

(75) Inventor: Yoshiyuki Ikuma, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 481 days.

(21) Appl. No.: 10/695,793

(22) Filed: Oct. 30, 2003

(65) Prior Publication Data

US 2004/0242166 A1      Dec. 2, 2004

(30) Foreign Application Priority Data

Oct. 31, 2002    (JP)    ............... 2002-318084

(51) Int. Cl.
*H04B 1/10*    (2006.01)
(52) U.S. Cl. ............... 455/308; 455/83; 455/210; 330/124 R
(58) Field of Classification Search ............... 455/82, 455/83, 78, 73, 210, 308; 330/124 R, 51, 330/53, 129, 151; 342/51; 333/81 A
See application file for complete search history.

(56) References Cited

U.S. PATENT DOCUMENTS 3,859,609 A * 1/1975 Couvillon et al. ........ 333/81 A
5,748,139 A * 5/1998 Kawakami et al. ........... 342/51
5,896,563 A * 4/1999 Kawanami et al. ........... 455/82
6,362,685 B1 * 3/2002 Vagher .................... 330/124 R

FOREIGN PATENT DOCUMENTS

JP    9-270601    10/1997

* cited by examiner

*Primary Examiner*—Matthew Anderson
*Assistant Examiner*—Sanh Phu
(74) *Attorney, Agent, or Firm*—Oblon, Spivak, McClelland, Maier & Neustadt, P.C.

(57) ABSTRACT

A transmitting/receiving module includes a first amplifier for amplifying a transmission signal, a second amplifier for amplifying a receiving signal, and a low reflection limiter provided on an input side of said second amplifier. There may be further provided a radiator from which the transmitting signal is to be radiated into an air and to which the receiving signal is to be received, and a circulator having a first terminal, a second terminal and a third terminal, in which the transmitting signal is inputted to the first terminal, the receiving signal is received by the radiator connected to the second terminal, the third terminal is connected to the second amplifier, and the low reflection limiter is provided between the circulator and the second amplifier.

8 Claims, 3 Drawing Sheets

LOW REFLECTION LIMITER AND TRANSMITTING/RECEIVING MODULE UTILIZING SAME

BACKGROUND OF THE INVENTION

1. Field of the Invention

The present invention relates to a low reflection limiter, which is to be typically used for an active phased array antenna and also relates to a transmitting/receiving module utilizing such a limiter.

2. Description of the Related Art

A transmitting/receiving module, which includes amplifiers for amplifying a transmitting signal and a receiving signal, is typically used for an active phased array antenna. The active phased array antenna has a plurality of radiators (i.e., antennas) for radiating the transmitting signal into the air. In a typical example, each of the radiators is provided with a transmitting/receiving module. In addition, there is provided, between the radiator and the transmitting/receiving module, a transmitting/receiving separation circuit for achieving separation between the transmitting signal and the receiving signal. Japanese Laid-Open (KOKAI) Publication No. H09-270601 describes a circuit for connecting such a transmitting/receiving module to the transmitting/receiving separation circuit.

Now, the conventional transmitting/receiving module will be described hereunder with reference to FIG. 5.

The transmitting signal is inputted from an input terminal "IN" into the transmitting/receiving module 50. A phase shifter 51 turns the phase of the transmitting signal so that the transmitting signal has a desired phase. Then, the transmitting signal is supplied to a power amplifier 53 through a transmitting/receiving switch 52, which is flipped to a transmitting side Sa, to provide an amplified signal. Such a transmitting signal passes through a transmitting/receiving separation-non-reciprocal circuit element, e.g., a circulator 54 in a direction of an arrow "Y" as shown in FIG. 5 in a low-loss manner. Then, the transmitting signal is sent from an output terminal "OUT" to a radiator 55 and radiated from the radiator 55 into the air. The transmitting signal, which has been radiated into the air and then reflected from a target, is then received by the radiator 55. The thus received signal is sent from the circulator 54 to a low-noise amplifier 56 to ensure low noise. Then, the signal passes through the transmitting/receiving switch 52, which is flipped to a receiving side Sb, the phase shifter 51 and the input terminal "IN", and is then sent to a signal processing circuit (not shown).

The active phased array antenna, which is provided with a plurality of combinations of the above-described transmitting/receiving module 50 and radiator 55, causes the transmitting signals, which have been radiated from the respective radiators 55 to provide a desired radiation pattern.

When the transmitting signal radiated into the air is reflected from an obstruction, existing at a short distance away from the radiator 55, the radiator 55 receives the reflected signal at a large intensity. Alternatively, radiating the signal in a certain direction may cause the radiator to receive the signal at a large intensity due to interference with the adjacent radiator. The above-described reflection from the obstruction or the interference with the adjacent radiator may cause undesired transmitting signal parts of components (hereinafter referred to as the "undesired reflection parts or components") to be inputted to the radiator. The undesired reflection components have various power amplitudes and phases. Such an undesired reflection component may have the power amplitude, which reaches up to $10^5$ (hundred thousands) times as large as a regular receiving signal.

Inputting the undesired reflection component having the large power amplitude into the transmitting/receiving module without applying any processing to the signal may cause damage to the low-noise amplifier for the receiving signal or a breakage thereof. When the undesired reflection component is inputted to the output side of the power amplifier for the transmitting signal for some reason, there apparently arises a situation, that is equivalent to application of load having adverse reflection properties to the power amplifier, thus disabling the desired performance from being achieved.

In view of these defects or problems, the conventional transmitting/receiving module is provided, for example, in the receiving system, to which the receiving signal is to be transmitted, with a protection circuit to protect the low-noise amplifier for the receiving signal and the power amplifier for the transmitting signal from the undesired reflection component.

Now, description will be given below of the conventional transmitting/receiving module provided with the protection circuit, with reference to FIG. 6. The same references as those in FIG. 5 are assigned to the corresponding components as shown in FIG. 6. Description of the same components will therefore be omitted.

In this conventional example, the receiving system is provided with a switch 61 serving as the protection circuit. The switch 61 is connected to a terminating resistor (which may be called a termination resistance) 62. The switching operation of the above-mentioned switch 61 is carried out in synchronization with the transmitting/receiving switch 52. The switch 61 is flipped to the terminal Sa when transmitting a transmitting pulse signal, and to the other terminal Sb when receiving such a signal.

According to the above-described configuration, the switch 61 interrupts a signal path of the receiving system, when transmitting the transmitting pulse signal. As a result, the undesired reflection components due to reflection of signals from an obstruction, existing at a short distance away from the radiator, or interference with the adjacent radiator, are prevented from being inputted to the low-noise amplifier 56, thus providing protection of the low-noise amplifier 56. In addition, the undesired reflection components are converted into heat by means of the terminating resistor 62. It is therefore possible to prevent the undesired reflection components from being inputted to the output side of the power amplifier 53, thus providing protection of the power amplifier 53.

Another example of the conventional transmitting/receiving module provided with the protection circuit will be described with reference to FIG. 7. The same references as those in FIG. 5 are assigned to the corresponding components as shown in FIG. 7. Description of the same components will therefore be omitted.

In this conventional example, a four-port circulator 71 is applied as a non-reciprocal circuit element for transmitting/receiving separation. The four-port circulator 71 is composed of, for example, a pair of three-port circulators, i.e., the first and second circulators 71a, 71b. The first three-port circulator 71a is connected at one terminal thereof with one terminal of the second three-port circulator 71b. In addition, a terminating resistor 72 is connected to the other terminal of the second three-port circulator 71b. A limiter diode 73 is connected between the four-port circulator 71 and the low-noise amplifier 56.

In this case, the undesired reflection component passes through the four-port circulator 71 and the power amplitude of the undesired reflection component is then limited by means of the limiter diode 73. It is therefore possible to decrease the power amplitude of the undesired reflection component, which has leaked from the limiter diode 73 to the low-noise amplifier 56, thus providing protection of the low-noise amplifier 56. In addition, almost all the remaining undesired reflection components, which have not leaked from the limiter diode 73 to the low-noise amplifier 56, are reflected by the limiter diode 73. The thus reflected undesired reflection components are supplied to the terminating resistor 72, which is connected to the second three-port circulator 71*b*, and then converted into heat. It is therefore possible to prevent the undesired reflection component from being inputted to the output side of the power amplifier 53, thus providing protection of the power amplifier 53.

A further example of the conventional transmitting/receiving module provided with the protection circuit will be described with reference to FIG. 8. The same references as those in FIG. 5 are assigned to the corresponding components as shown in FIG. 8. Description of the same components will therefore be omitted.

In this conventional example, a switch 81 is substituted for the non-reciprocal circuit element to a position at which there is achieved separation between the transmitting signal and the receiving signal. The switching operation of the above-mentioned switch 81 is carried out in synchronization with the transmitting/receiving switch 52. The switch 81 is flipped to the terminal Sa when transmitting a transmitting pulse signal and to the other terminal Sb when receiving such a signal.

According to the above-described configuration, the switch 81 interrupts a signal path of the receiving system, when transmitting the transmitting pulse signal, thus preventing the undesired reflection component from being inputted to the low-noise amplifier 56. In such measures, the undesired reflection component is inputted to the output side of the power amplifier 53, thus disabling the desired performance from being achieved.

In the configuration as shown in FIG. 6, a PIN-diode or a field-effect transistor (hereinafter referred to as the "FET") is normally used as the switch 61.

The PIN-diode, which has a low insertion loss, is useful to manufacture the transmitting/receiving module having a low noise factor and good noise characteristics. A driving circuit for turning the PIN-diode "ON" or "OFF" at high speed is, however, required, thus leading to an increased cost and a large size. In addition, power consumption required for driving the PIN-diode becomes measurable. In addition, it is difficult to prepare the switch with the PIN-diode in the form of MMIC (Monolithic Microwave Integrated Circuit), thus leading to a few cases where the switch utilizing the PIN-diode is used as the MMIC.

The FET has an advantage that the power consumption required therefor is smaller than the PIN-diode. In addition, a control circuit for turning the FET "ON" or "OFF" at high speed may be composed of a CMOS (complementary metal oxide semiconductor) logic circuit, thus facilitating supply of the device at low cost. The above-mentioned control circuit for turning the FET "ON" or "OFF" is however required, leading to a large size. The FET has a high insertion loss, with the result that increase in power amplitude of the undesired reflection part or component deteriorates the noise characteristics of the receiving system.

The measures according to the structure of FIG. 7 have advantages that neither driving circuit nor control circuit is required, the noise characteristics are good and the power consumption is low. However, in this example, the use of two circulators causes the increased cost, the enlarged size and the increased mass. It is therefore difficult to provide a small-sized or low-cost transmitting/receiving module.

The measures of the structure of FIG. 8 provide the good noise characteristics. The undesired reflection component is, however, inputted to the power amplifier for amplifying the transmitting signal. As a result, there cannot be provided one of the fundamental functions of the protection circuit, e.g., the function of giving stability to the performance of the power amplifier, which is located on the transmitting side. Accordingly, the measures as shown in FIG. 8 are limitedly applied to a case where the undesired reflection component is small, for example, a beam scanning angle is narrow. The cost of the device, the power consumption and the size thereof are substantially equal to those as shown in FIG. 6. The further reduction in size is desired.

SUMMARY OF THE INVENTION

An object of the present invention, which was conceived in order to obviate defects or drawbacks encountered in the prior art mentioned above, is therefore to provide a low reflection limiter, which enables the size and cost of a transmitting/receiving module to be decreased, as well as the transmitting/receiving module utilizing such a low reflection limiter.

The above and other objects can be achieved according to the present invention by providing, in one aspect, a transmitting/receiving module comprising:

a first amplifier for amplifying a transmitting signal;

a second amplifier for amplifying a receiving signal; and a low reflection limiter provided on an input side of the second amplifier.

In the above aspects, the transmission signal is radiated into an air from a radiator externally arranged in association with the transmitting/receiving module and the receiving signal is received by the radiator. Furthermore, the module may further comprise a circulator having a first terminal, a second terminal and a third terminal, wherein the transmitting signal is inputted to the first terminal, the receiving signal is received through the second terminal, the third terminal is connected to the second amplifier, and the low reflection limiter is provided between the circulator and the second amplifier.

In a more specific aspect, there is provided a transmitting/receiving module comprising:

a first amplifier for amplifying a transmitting signal;

a second amplifier for amplifying a receiving signal;

a low reflection limiter provided on an input side of the second amplifier, in which the transmitting signal is radiated into an air from a radiator, which is externally arranged in association with the transmitting/receiving module and the receiving signal is received by the radiator; and a circulator having a first terminal, a second terminal and a third terminal, wherein the transmitting signal is inputted to the first terminal, the receiving signal is received by the radiator connected to the second terminal, the third terminal is connected to the second amplifier, and the low reflection limiter is provided between the circulator and the second amplifier.

In the above aspects, the low reflection limiter may include a limiter diode and a resistor, which are connected in series with each other.

The low reflection limiter may include a plurality of series connection circuits, each of which comprises a limiter diode and a resistor connected in series with each other, and at least one quarter-wavelength line provided between adjacent two series connection circuits of the plurality of series connection circuits.

The low reflection limiter may further include a first directional coupler, the first directional coupler having a first terminal into which the receiving signal is inputted, a second terminal connected to a terminating resistor or termination resistance, a third terminal connected to a first limiter diode, and a fourth terminal connected to a second limiter diode. There is further provided a second directional coupler, which has a first terminal connected to the first limiter diode, a second terminal connected to the second limiter diode, a third terminal connected to the second amplifier, and a fourth terminal connected to a terminating resistor.

In a further specific aspect, there is provided a transmitting/receiving module comprising:

a first amplifier for amplifying a transmitting signal;

a circulator having a first terminal to which the transmitting signal is inputted, a second terminal connected to a radiator, which is externally arranged in association with the transmitting/receiving module, and the receiving signal is received by the radiator, and a third terminal to which the receiving signal received by the radiator is inputted;

a first directional coupler having a first terminal connected to the third terminal of the circulator, a second terminal connected to a terminating resistor, a third terminal connected to a first limiter diode, and a fourth terminal connected to a second limiter diode.

a second amplifier connected to the first limiter diode for amplifying the receiving signal;

a third amplifier connected to the second limiter diode for amplifying the receiving signal; and a second directional coupler having a first terminal connected to the second amplifier, a second terminal connected to the third amplifier, a third terminal into which a composite signal which is amplified by the second amplifier and the third amplifier is inputted, and a fourth terminal connected to a terminating resistor.

In the other aspects of the present invention, there is provided a low reflection limiter comprising:

a limiter diode; and a resistor having one end, which is connected to the limiter diode, and another end, which is grounded.

There is also provided a low reflection limiter comprising:

a plurality of series connection circuits, each of which comprises a limiter diode and a resistor connected in series to the limiter diode and having one end grounded, and at least one quarter-wavelength line provided between adjacent two series connection circuits of said plurality of series connection circuits.

There is further provided a low reflection limiter comprising:

a directional coupler having a first terminal to which the receiving signal is inputted, a second terminal, a third terminal and a fourth terminal;

a terminating resistor (or termination resistance) connected to the second terminal of the directional coupler;

a first limiter diode connected to the third terminal of the directional coupler; and a second limiter diode connected to the fourth terminal of the directional coupler.

According to the structures and/or characters of the present invention mentioned above, the low reflection limiter performs the limiting function of restricting the reflection power component or part, thus protecting the low-noise amplifier of the receiving system. In addition, the low reflection limiter achieves the low reflection function of reducing an amount of the leak power component, which is to be inputted to the output side of the power amplifier arranged in the transmitting system, or preventing such a reflection power component from being inputted to the output side thereof, thus giving stability to the performance of the power amplifier in the transmitting system.

Furthermore, the low reflection limiter includes no switch, resulting in the simple circuit structure and facilitating miniaturization and manufacture in a low cost. The low reflection limiter has the low insertion loss, thus improving the noise characteristics of the receiving system. The low reflection limiter, which causes no power consumption, can therefore easily be incorporated into a MMIC (Monolithic Microwave Integrated Circuit), thus facilitating manufacture of the low cost, small-sized and lightweight microwave transmitting/receiving module.

The nature and further characteristic features of the present invention will be made more clear from the following descriptions made with reference to the accompanying drawings.

DESCRIPTION OF THE PREFERRED EMBODIMENTS

Figure 1:
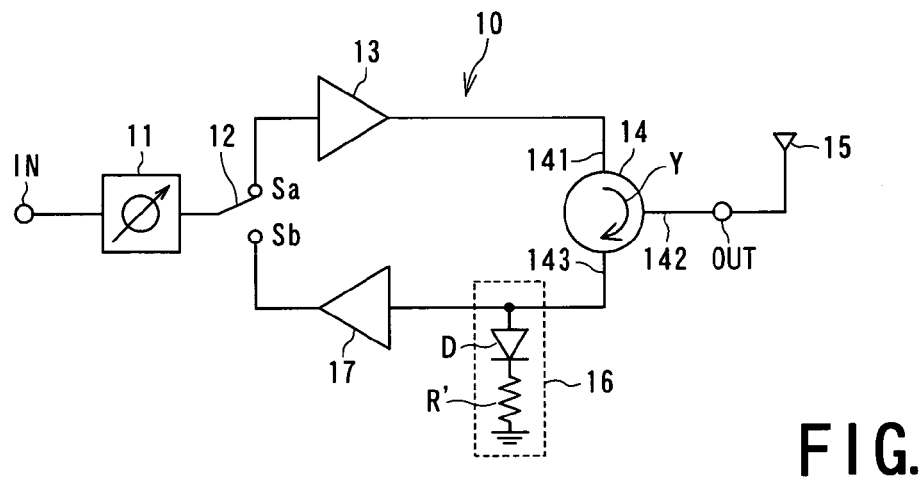
FIG. 1 is a circuit diagram illustrating a first embodiment including a low reflection limiter of the present invention.
Figure 2:
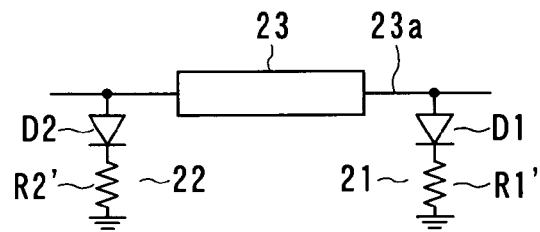
FIG. 2 is a circuit diagram illustrating another example of the low reflection limiter used in the first embodiment of FIG. 1.

A preferred first embodiment of the present invention will be first described hereunder 1 with reference to FIG. 1, taking an active phased array antenna to which the present invention is applied, as an example.

A transmitting signal is inputted through an input terminal "IN" to a transmitting/receiving module 10. A phase shifter 11 shifts or turns the phase of the transmitting signal so that the transmitting signal has a desired phase. Then, the transmitting signal is supplied to a power amplifier 13 through a transmitting/receiving switch 12, which is flipped to a transmitting side (terminal) Sa, to provide an amplified signal. Such a transmitting signal is then sent to a transmitting/receiving separation circuit for achieving separation between the transmitting signal and the receiving signal, e.g., a circulator 14, which is a non-reciprocal circuit element.

The circulator 14 has three terminals, i.e., the first to third terminals 141 to 143. The first terminal 141 is connected to the power amplifier 13 and the second terminal 142 is connected to an output terminal "OUT" and a radiator (or antenna) 15, which is externally arranged in association with the transmitting/receiving module of the present embodiment.

The transmitting signal, which has been sent to the circulator 14, travels in a forward direction as indicated by an arrow "Y" in a low-loss manner. Then, the transmitting signal is sent to the radiator 15 through the output terminal "OUT" and radiated from the radiator 15 into the air.

The transmitting signal, which has been radiated into the air and then reflected from, for example, a target, is then received by the radiator 15. The thus received signal, i.e., the receiving signal is sent to the circulator 14 through the output terminal "OUT" and travels in the forward direction as indicated by an arrow "Y" in a low-loss manner, and is then sent from the third terminal 143 to a low reflection limiter 16. The low reflection limiter 16 is composed for example of a series connection circuit of a limiter diode "D", which is grounded, and a resistor "R'" having one end grounded.

The receiving signal is sent from the low reflection limiter 16 to a low-noise amplifier 17 to ensure low noise. Then, the receiving signal passes through a transmitting/receiving switch 12, which is flipped to a receiving side (terminal) Sb, the phase shifter 11, and is then sent to a signal processing circuit, not shown.

The active phased array antenna, which is provided with a plurality of combinations of the transmitting/receiving module 10 and radiator 15, causes the transmitting signals, which have been radiated from the respective radiators 15 so as to provide a desired radiation pattern.

According to the configuration as described above, the low reflection limiter 16 is connected to the input side of the low-noise amplifier 17, for example between the low-noise amplifier 17 and the circulator 14, between which the receiving signal is to be transmitted. In such a configuration, when the radiator 15 receives the undesired reflection part or component, the power amplitude of the undesired reflection component is limited by means of the low reflection limiter 16. It is therefore possible to decrease the power amplitude of the undesired reflection component, which has leaked from the low reflection limiter 16 to the low-noise amplifier 17 for the receiving signal, thus providing protection of the low-noise amplifier 17.

The low reflection limiter 16 is composed of, for example, the series connection circuit of the limiter diode D and the resistor R', as described above. Inputting the undesired reflection components having high power to such a low reflection limiter 16 causes the limiter diode D to turn "ON", with the result that the transmitting path through which the receiving signal is transmitted, is grounded through the resistor R. At this time, part of the undesired reflection components passes through the resistor R'. Accordingly, the low reflection limiter 16 does not perform a complete reflection of reflecting the whole signal as inputted, but reflects the part of the signal. More specifically, there is provided a low reflection with a lower reflection component than a case where the limiter diode is directly grounded without using the resistor.

In such an arrangement, the remaining undesired reflection components, which have not leaked to the side of the low-noise amplifier 17, may be divided into a power part or component A, which is reflected by the low reflection limiter 16, and a power component B, which is converted into heat by the resistor R.

Figure 6:
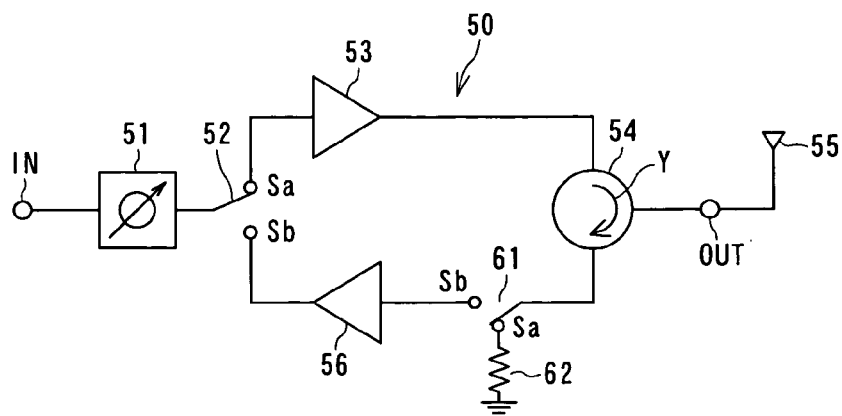
FIG. 6 is a circuit diagram illustrating another conventional example.
Figure 7:
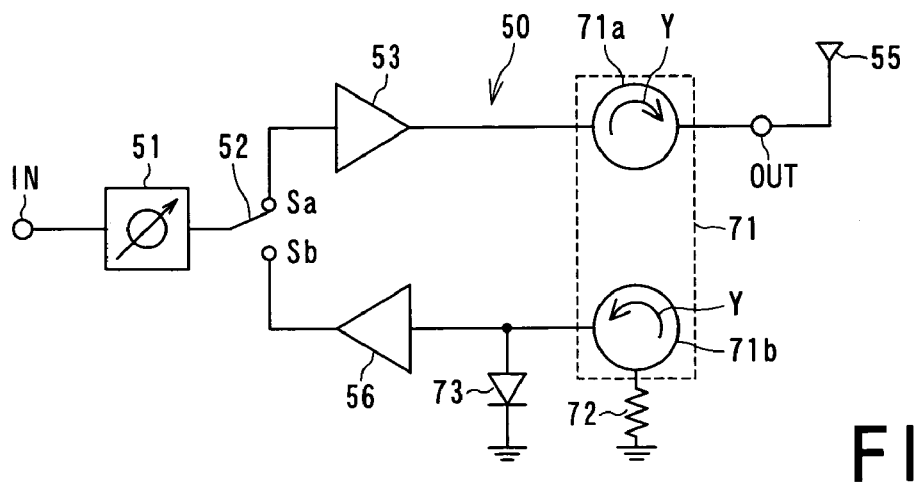
FIG. 7 is a circuit diagram illustrating a further conventional example.
Figure 8:
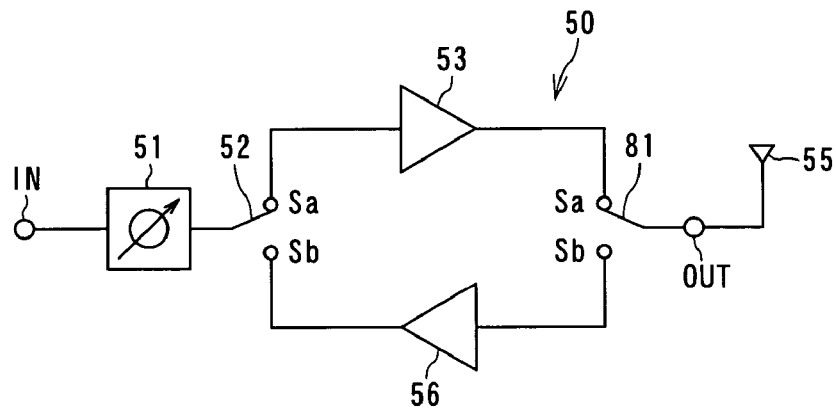
FIG. 8 is a circuit diagram illustrating a further conventional example.

The sum of the power component A and the power component B is constant according to the law of the conservation of energy. The power component A is inputted through the circulator. 14 to the output side of the power amplifier 13. On the other hand, however, the power component A, which is to be inputted to the output side of the power amplifier 13, is not always required to be null, as shown in FIGS. 6 and 7 concerning the conventional prior art. Limiting the power component A to about one-tenth of the transmitting power suffices to achieve the desired performance, thus causing no problems.

The insertion loss of the low reflection limiter decreases with the smaller value of the power component B, thus providing good noise characteristics of the receiving system. Optimizing the ratio of the power component A to the power component B so that, for example, the power component A is increased to the maximum value within the range thereof in which the desired performance can be achieved by the power amplifier 13, while the power component B is minimized, provides protection of the amplifiers 17, 13 of the respective receiving system and the transmitting system, and simultaneously, prevents the noise characteristics of the receiving system from being deteriorated.

According to the above-described configuration, no driving power for driving the low reflection limiter 16 is required, thus making it possible to reduce the power consumption to null. In addition, neither switch for the protection circuit, nor circuit for driving or controlling such a switch is not required, thus leading to miniaturization. The low reflection limiter 16 having the above-described configuration can easily be incorporated into a MMIC (Monolithic Microwave Integrated Circuit), thus providing the transmitting/receiving module having the low cost, the small size and the lightweight.

In FIG. 1, the low reflection limiter 16 is composed of a single set of the limiter diode D and the resistor R'. There may be adopted an alternative configuration in which there are provided the first series connection circuit 21 in which the limiter diode D1 and the resistor R1' are connected in series with each other, and the second series connection circuit 22 in which the limiter diode D2 and the resistor R2' are connected in series with each other, and a quarter-wavelength (¼-wavelength) line 23 is connected between the first series connection circuit 21 and the second series connection circuit 22.

In such a case, the undesired reflection component, which has been reflected at the input end 23a of the quarter-wavelength line 23 and the undesired reflection component, which has been reflected by the second series connection circuit 22, cancel each other out in opposite phase at the above-mentioned input end 23a of the quarter-wavelength line 23, thus reducing the undesired reflection component directed from the lower reflection limiter 16 toward the circulator 14.

There may be adopted another alternative configuration in which there are provided three or more series connection circuits each of which includes the limiter diode and the resistor that are connected in series with each other, and the quarter-wavelength line is provided between the adjacent two series connection circuits of the above-mentioned three or more series connection circuits.

Figure 3:
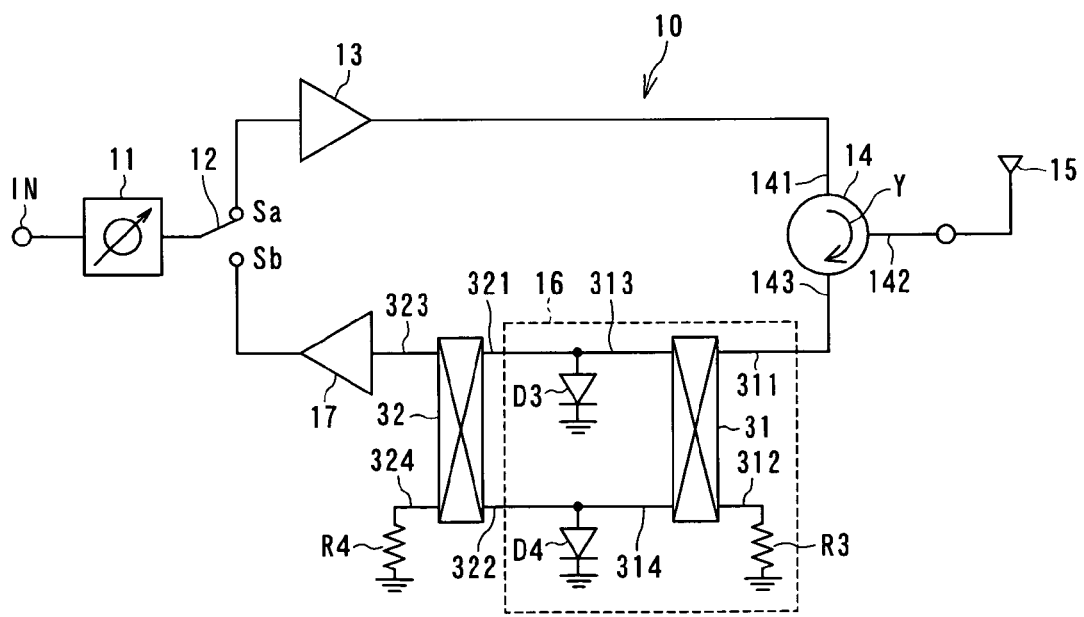
FIG. 3 is a circuit diagram illustrating a second embodiment of the present invention.

A second embodiment of the present invention will be described hereunder with reference to FIG. 3. The same references as those in FIG. 1 are assigned to the corresponding components as shown in FIG. 3. Description of the same components will therefore be omitted.

In this embodiment, the low reflection limiter 16 includes the first directional coupler 31. The first directional coupler 31 has for example four terminals, i.e., the first to fourth terminals 311 to 314. The first directional coupler 31 is configured so that the signal inputted from the first terminal 311 is divided equally into two for the third terminal 313 and the fourth terminal 314, to output the divided signals in a phase difference of 90 degrees therefrom.

The first terminal 311 of the first directional coupler 31 is connected to the third terminal 143 of the circulator 14. The second terminal 312 of the first directional coupler 31 is connected to the terminating resistor R3, the third terminal 313 thereof is connected to the first limiter diode D3 and the fourth terminal 314 thereof is connected to the second limiter diode D4.

The first limiter diode D3 is connected to the first terminal 321 of the second directional coupler 32 and the second limiter diode D4 is connected to the second terminal 322 of the second directional coupler 32. The third terminal 323 of the second directional coupler 32 is connected to the low-noise amplifier 17 and the fourth terminal 324 thereof is connected to the terminating resistor R4. The second directional coupler 32 is configured so that the signal inputted from the first terminal 321 is divided equally into two for the third terminal 323 and the fourth terminal 324, to output the divided signals in a phase difference of 90 degrees therefrom, in the same manner as the first directional coupler 31.

In the above-described structure or arrangement, the receiving signal is divided into two, which are outputted to the third terminal 313 and the fourth terminal 314 of the first directional coupler 31. The outputted signals pass through the first and second limiter diodes D3, D4, respectively, and are then combined by the second directional coupler 32 into a combined signal. Such a combined signal is outputted from the third terminal 323 of the second directional coupler 32 and then amplified by the low-noise amplifier 17 for the receiving signal.

According to the arrangement as described above, when the undesired reflection components are inputted to the first terminal 311 of the first directional coupler 31, these components are outputted to the third terminal 313 and the fourth terminal 314 thereof and the power amplitudes of these components are limited by means of the first and second limiter diodes D3, D4. It is therefore possible to decrease the power amplitudes of the undesired reflection components, which have leaked from the low reflection limiter 16 to the low-noise amplifier 17 for the receiving signal, thus providing protection of the low-noise amplifier 17.

In this case, almost all of the remaining undesired reflection components, which have not leaked from the low reflection limiter 16 to the low-noise amplifier 17, are reflected by the first and second limiter diodes D3, D4. Such reflection components are converted into heat by means of the terminating resistor R3, which is connected to the first directional coupler 31. As a result, there can be provided a low reflection in which there is almost no existence of the undesired reflection components, which is directed from the low reflection limiter 16 toward the circulator 14, and the undesired reflection components, which are to be inputted to the output side of the power amplifier 13, are also restricted.

Accordingly, there can be obtained the same effects as in the configuration shown in FIG. 1, for example of protection of the low-noise amplifier 17 for the receiving signal and the power amplifier 13 for the transmitting signal.

In this case, loss increases due to connection of the directional couplers, leading to an unfavorable effect on the noise characteristics of the receiving system. However, the noise characteristics with such an unfavorable effect is even more excellent than the conventional prior art.

Figure 4:
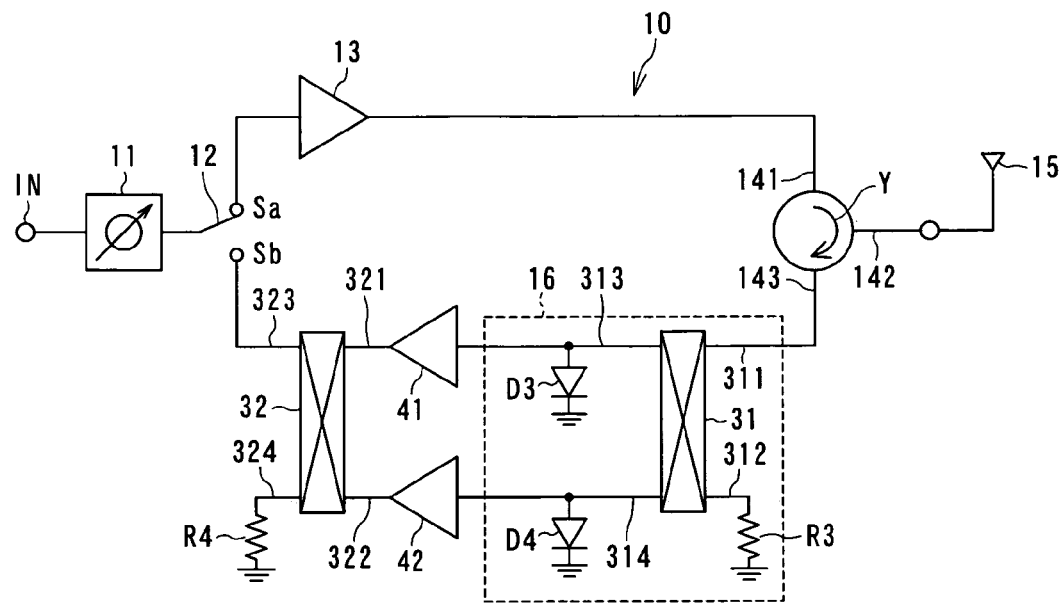
FIG. 4 is a circuit diagram illustrating a third embodiment of the present invention.
Figure 5:
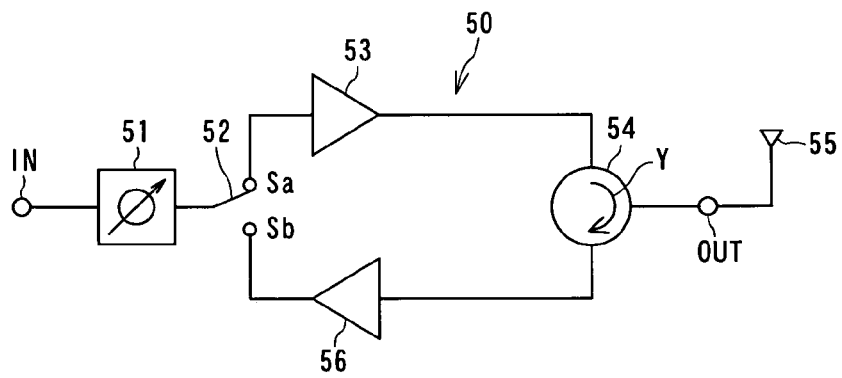
FIG. 5 is a circuit diagram illustrating a conventional example.

A third embodiment of the present invention will be described hereunder with reference to FIG. 4. The same references as those in FIG. 3 are assigned to the corresponding components as shown in FIG. 4. Description of the same components will therefore be omitted.

In this embodiment, the low-noise amplifiers 41, 42 are connected to the first and second limiter diodes D3, D4, respectively. The low-noise amplifier 41 is connected to the first terminal 321 of the second directional coupler 32 and the other low-noise amplifier 42 is connected to the second terminal 322 of the second directional coupler 32. The third terminal 323 of the second directional coupler 32 is connected to the transmitting/receiving switch 12 and the fourth terminal thereof is connected to the terminating resistor R4.

In the above-described arrangement or structure, the receiving signals, which have been amplified by the low-noise amplifiers 41, 42, are combined into a composite signal. Such a combined signal is outputted from the third terminal 323 of the second directional coupler 32.

The power amplitudes of the undesired reflection components are limited by means of the first and second limiter diodes D3, D4. It is therefore possible to decrease the power amplitudes of the undesired reflection components, which have leaked from the first and second limiter diodes D3, D4 to the low-noise amplifiers 41, 42, respectively, thus providing protection of the low-noise amplifiers 41, 42.

Almost all of the remaining undesired reflection components, which have not leaked to the low-noise amplifiers 41, 42, are reflected by the first and second limiter diodes D3, D4. Such reflection components are converted into heat by means of the terminating resistor R3, which is connected to the first directional coupler 31. As a result, there can be provided a low reflection in which there is almost no existence of the undesired reflection components, which is directed from the low reflection limiter 16 toward the circulator 14, and the undesired reflection components, which are to be inputted to the output side of the power amplifier 13, are also restricted.

Accordingly, there can be obtained the same effects as in the configuration shown in FIG. 3, for example of protection of the two low-noise amplifiers 41, 42 for the receiving signal and the power amplifier 13 for the transmitting signal.

According to the configurations as described above, the low reflection limiter performs the limiting function of restricting the leak power component, so as to protect the low-noise amplifier of the receiving system. In addition, the low reflection limiter achieves the low reflection function of reducing an amount of the reflection power component, which is to be inputted to the output side of the power amplifier placed in the transmitting system, or preventing such a reflection power component from being inputted to the output side thereof, thus giving stability to the performance of the power amplifier in the transmitting system.

In addition, the low reflection limiter includes no switch, thus leading to the simple circuit configuration and facilitating miniaturization and manufacture in a low cost. The low reflection limiter has the low insertion loss, thus improving the noise characteristics of the receiving system. The low reflection limiter, which causes no power consumption, can therefore easily be incorporated into a MMIC (Monolithic Microwave Integrated Circuit), thus facilitating manufacture of the low cost, small-sized and lightweight microwave transmitting/receiving module.

What is claimed is:

1. A transmitting/receiving module, comprising:
a first amplifier which amplifies a transmission signal;
a second amplifier which amplifies a receiving signal; and a low reflection limiter provided on an input side of said second amplifier, wherein said low reflection limiter comprises a plurality of series connection circuits, each of which comprises a limiter diode and a resistor connected in series with each other, and at least one quarter-wavelength line, a first side of which is connected to a first series connection circuit of the plurality of series connection circuits and a second side of which is connected to a second series connection circuit of the plurality of series connection circuits.

2. A transmitting/receiving module according to claim 1, wherein said low reflection limiter comprises a first directional coupler, said first directional coupler having a first terminal into which the receiving signal is inputted, a second terminal connected to a terminating resistor, a third terminal connected to a first limiter diode, and a fourth terminal connected to a second limiter diode.

3. A transmitting/receiving module according to claim 2, further comprising a second directional coupler, said second directional coupler having a first terminal connected to the first limiter diode, a second terminal connected to the second limiter diode, a third terminal connected to the second amplifier, and a fourth terminal connected to a terminating resistor.

4. A transmitting/receiving module comprising:
a first amplifier which amplifies a transmission signal;
a second amplifier which amplifies a receiving signal;
a low reflection limiter provided on an input side of said second amplifier, in which the transmission signal is radiated into an air from a radiator externally arranged in association with the transmitting/receiving module and the receiving signal is received by the radiator;
a circulator having a first terminal, a second terminal, and a third terminal,
wherein the transmission signal is inputted to the first terminal, the receiving signal is received by the radiator connected to the second terminal, the third terminal is connected to the second amplifier, and the low reflection limiter is provided between the circulator and the second amplifier, and
wherein said low reflection limiter comprises a plurality of series connection circuits, each of which comprises a limiter diode and a resistor connected in series with each other, and at least one quarter-wavelength line, a first side of which is connected to a first series connection circuit of the plurality of series connection circuits and a second side of which is connected to a second series connection circuit of the plurality of series connection circuits.

5. A transmitting/receiving module according to claim 4, wherein said low reflection limiter comprises a first directional coupler, said first directional coupler having a first terminal into which the receiving signal is inputted, a second terminal connected to a terminating resistor, a third terminal connected to a first limiter diode, and a fourth terminal connected to a second limiter diode.

6. A transmitting/receiving module according to claim 5, further comprising a second directional coupler, said second directional coupler having a first terminal connected to the first limiter diode, a second terminal connected to the second limiter diode, a third terminal connected to the second amplifier, and a fourth terminal connected to a terminating resistor.

7. A transmitting/receiving module comprising:
a first amplifier which amplifies a transmission signal;
a circulator having a first terminal to which the transmission signal is inputted, a second terminal connected to a radiator, which is externally arranged in association with the transmitting/receiving module, and a third terminal to which the receiving signal received by the radiator is inputted;
a first directional coupler having a first terminal connected to the third terminal of the circulator, a second terminal connected to a terminating resistor, a third terminal connected to a first limiter diode, and a fourth terminal connected to a second limiter diode;
a second amplifier connected to the first limiter diode for amplifying the receiving signal;
a third amplifier connected to the second limiter diode for amplifying the receiving signal; and
a second directional coupler having a first terminal connected to the second amplifier, a second terminal connected to the third amplifier, a third terminal into which a combined signal which is amplified by the second amplifier and the third amplifier is inputted, and a fourth terminal connected to a terminating resistor.

8. A low reflection limiter comprising:
a plurality of series connection circuits, each of which comprises a limiter diode and a resistor connected in series to the limiter diode and having one end grounded, and at least one quarter-wavelength line, a first side of which is connected to a first series connection circuit of the plurality of series connection circuits and a second side of which is connected to a second series connection circuit of the plurality of series connection circuits.

* * * * *